Figure 1:
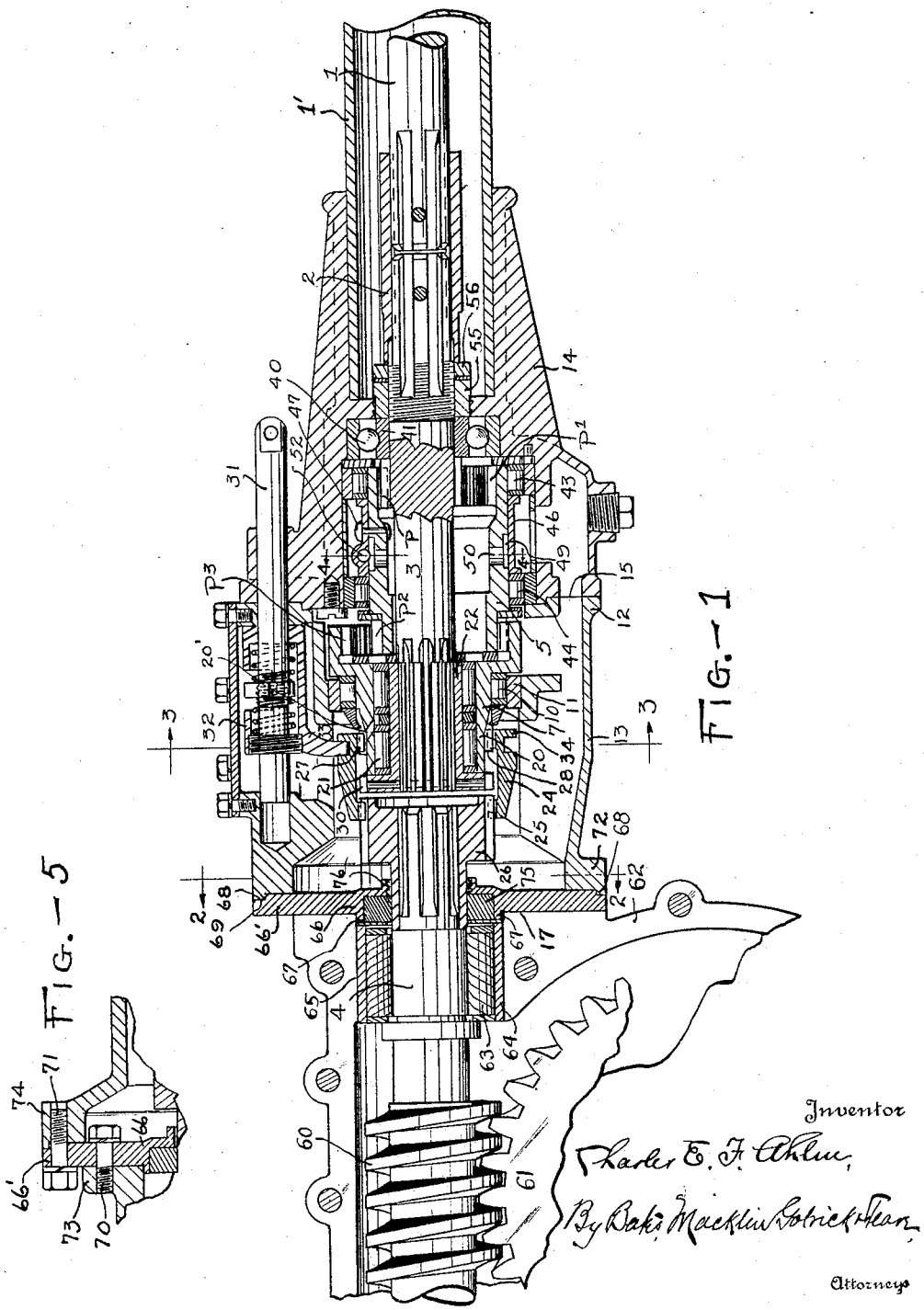

March 22, 1932.     C. E. F. AHLM     1,850,089
TRANSMISSION GEARING
Filed Nov 18, 1925     2 Sheets-Sheet 2
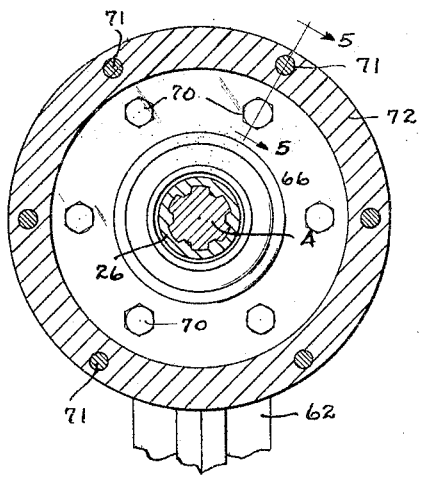
FIG.- 2
FIG.- 3
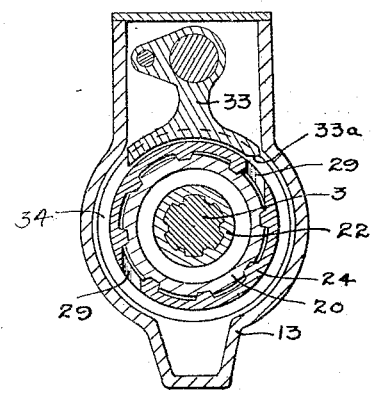
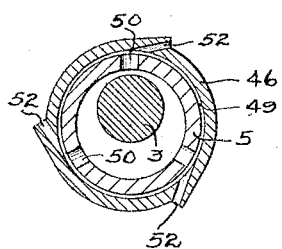
FIG.- 4
Inventor
Charles E. F. Ahlm,
By Davis, Macklin, Gobrick & Tear
Attorneys Patented Mar. 22, 1932

1,850,089

UNITED STATES PATENT OFFICE

CHARLES E. F. AHLM, OF EAST CLEVELAND, OHIO, ASSIGNOR TO AUTOMOTIVE PATENT HOLDING COMPANY, OF CLEVELAND, OHIO, A CORPORATION OF DELAWARE

TRANSMISSION GEARING

Application filed November 18, 1925. Serial No. 69,762.

This invention relates to transmission gearing of the type particularly adapted to serve as an auxiliary transmission in connection with the usual change speed transmission, to secure an additional change of speed for each speed delivered by such change speed transmission and direct drive as well.

The primary object is to provide a change speed gearing for connecting a driving and a driven member in such a manner that one rotates considerably faster than the other, in which the weight and size of the operating parts are comparatively small and all parts of which may be easily and cheaply manufactured.

The transmission as shown is particularly designed to deliver a single speed reduction from a main transmission to the worm shaft of a worm drive differential, and a further object is to provide an adapter construction for the differential and gearing housings which will permit the use of as many of the already existing differential parts as possible without alteration, thereby avoiding replacement of these parts and the usual trouble in fitting such replacements.

An object is to accurately center the axis of rotation of the driven member of the reduction gearing with the axis of the worm shaft. I accomplish this by utilizing machined cylindrical surfaces in both housings which are concentric to the bearings of the shafts such surfaces closely fitting a single pilot member which in the present construction serves also as the adapter to facilitate attaching the gearing housing to the differential housing.

Other objects and features will become apparent from the further description of my invention relating to the accompanying drawings, wherein I have shown my preferred form. The essential novel characteristics will be summarized in the claims.

In the drawings, Fig. 1 is a substantially central longitudinal section through the gearing; Fig. 2 is a transverse section through the gearing as indicated by the line 2—2 on Fig. 1. Fig. 3 is a transverse section as indicated by the line 3—3 on Fig. 1. Fig. 4 is a transverse cross section as indicated by the line 4—4 on Fig. 1. Fig. 5 is a fragmentary longitudinal section as indicated by the line 5—5 on Fig. 2.

Referring in detail to the drawings, and indicating the various parts by suitable characters, 1 indicates a driving shaft which in the embodiment shown is the rear end of the usual propeller shaft extending from the universal joint connection with a main transmission unit. The shaft 1 is preferably coupled by a splined collar 2 to an intermediate driving member 3, shown as supported by suitable bearings to be later referred to in detail.

The member 3 is arranged to be connected directly to a driven member 4 and also to be connected thereto by reduction gearing for a single reduced speed. This reduction gearing comprises an eccentrically mounted internal-external gear member designated 5, and which is provided with internal gear teeth P1 shown as constantly in mesh with teeth P rigid with the intermediate driving shaft 3. The internal-external gear has also external teeth P2 on its other end shown as constantly in mesh with internal gear teeth P3 on a tubular gear member 7 in axial alignment with the members 3 and 4. This gear 7 has a support intermediate its ends by reason of a roller bearing 10 which bears against a tubular portion 20 of the gear. The rollers are supported by a bearing race 11 carried by the casing 12. The casing preferably comprises end sections 13 and 14, which sections may be suitably bolted together along the line 15. The tubular portion 20 of the gear member 7 surrounds the shaft 3, as shown, and carries on its inner periphery, spaced roller bearings indicated at 21, which bear against a sleeve 22 splined to the rear end of the shaft. Thus the bearing 10 finally supports the rear end of the shaft 3.

Suitable means for connecting the gear 7 to the driven member 4 may comprise an internal clutch member 24 shown as having a sliding dental connection at 25 with a dental member 26 substantially rigid on the driven shaft 4. This sliding clutch member is arranged to be shifted forwardly to the position shown to cause clutch teeth 27 on the member to engage teeth 28 on the gear member 7, which connection results in a reduced speed being imparted to the shaft 4. This reduction is by reason of the smaller driving gear P engaging the teeth of the larger gear P' and the small gear P2 engaging teeth of the larger gear P3, resulting in a compound reduction. For direct drive the clutch member 24 is shifted to its rearmost position, the teeth 27 thereof engaging teeth 30 on the flanged end of the sleeve 22, which results in a direct connection between the shafts 3 and 4.

Any suitable means may be provided for shifting the dental clutch member 24. I have shown a shifting bar 31 mounted in suitable bearings in the casing sections which bar carries a head 32 resiliently mounted with respect to the bar and which head has the usual depending finger extending from an arm 33 for engaging the usual clutch rings 34 on the member 24. This shifting arrangement has been shown, described and claimed in my Patent, 1,696,178, granted Dec. 25, 1928.

I have arranged for positioning the shaft 3 in the casing without subjecting the shaft to rubbing thrust contact with its support at any point. The bearing support for the front end of the shaft, as shown, comprises a ball bearing 40 supported in the casing and having its inner race 41 mounted near the front end of the shaft. The shaft is held against longitudinal shifting by reason of the abutting engagement between the gear P and the bearing race member 41 which race is clamped between the teeth and a nut 55 threaded on the shaft 3, and suitably locked in place as by a lock nut 56.

A feature of the invention appears in the arrangement of the gear teeth on the internal-external gear 5 and of the bearings for the gear. The pinion teeth P on the shaft may be formed integrally therewith as previously mentioned and the cooperating teeth P1 on the internal-external gear 5 are formed at the extreme forward end thereof. Since only a few of the teeth of gear P and P' are in mesh at a time there is always considerable strain on the teeth as well as on the bearings that support the gear members. A bearing 43 is positioned in radial alignment with the teeth of the gears P and P' thus providing a direct support for the gears.

The teeth P2 are at the other end of the gear 5 and if desired may be made on almost the same pitch diameter as the teeth P1 in order to secure a large reduction with gears of small size and consequently light weight. It will be apparent that if the gears P1 and P2 were approximately in the same plane, there would have to be considerable difference in their pitch diameters, and the gear P3 would also have to be proportionately large.

To minimize overhang of the gear P2 from its support a bearing 44 is placed as close to the gear P2 as practicable and it will be noted that this bearing is supported by the same housing member as the bearing 43. It will also be noted that radial alignment of gear teeth and bearing permits the bearings 43 and 44 to be well spaced apart thus further increasing the rigidity of the support for the eccentric gear member without adding to its length.

The bearings 43 and 44 are shown as separated by an annular member 46 shown as riveted to the body of the member 5 at 47. The periphery intermediate the ends of the member 5 is shown as cut away at 49 to provide a recess between the separator and the member, and any suitable number of openings such as 50 communicate between this recess and the interior of the gear 5 in order to feed oil thereinto. To force oil into the interior to lubricate the teeth P and P1 as well as the bearing 40, I preferably employ oil scoops such as designated 52, Fig. 4, formed in the separator member 46, which are arranged to scoop oil from the well, at the bottom of the casing, the level of which oil rises substantially above the lower edge of the separator under ordinary running conditions.

I utilize a similar arrangement for oiling the bearings 21 and clutch teeth 28 and 30. In the latter arrangement, however, I utilize in addition the lower end of the shipper arm 33 to force oil collected between the rings 34, inwardly through tangentially arranged openings 29 in the clutch member 24. The clutch arm 33 extends close to the clutch member 24 and substantially fills the space between the clutch rings 34, for a little distance. As shown particularly in Figure 3, one end of the shipper arm 33 is beveled as at 33a. As viewed in Figure 3 the clutch member 34 always rotates in a counter-clockwise direction and the arrangement of openings 29 is such that, as the clutch member is rotated, oil is scooped up by the openings out of the supply of oil contained in the casing and the rotation tends to force such oil inwardly. By reason of the proximity of the rings to each other a quantity of oil is also picked up by capillary attraction and carried around from the oil supply into contact with the bevel 33a, which in effect dams up the oil and forces it through the openings 29. Thus I have provided a very effective forced feed lubrication with reference to the bearings 21 and the clutch teeth. The oil so fed is allowed to enter the interior of the tubular portion of the gear 7 by reason of suitable openings such as indicated at 20', Fig. 1.

As previously mentioned the transmission gearing shown is designed to be especially applicable to a Ford worm drive differential mechanism. Obviously the use of as much as possible of the already existing differential mechanism, in applying the auxiliary transmission, cheapens the application. By my invention I am enabled to use the worm shaft and the bearings therefor without change. This worm shaft has been previously designated 4 and referred to as the driven member of my transmission. The worm 60 carried by the shaft meshes with a worm gear 61 mounted in the differential gearing housing 62. The bearing designated 63, has its outer bearing race 64 suitably retained in a circular recess 65 between the differential housing sections which join along a plane coincident with the axis of the worm. My auxiliary transmission housing member 13 has an annular shoulder formed by a rib 68 adjacent the outer edge of a flange 72. This rib may be machined when the housing member 13 is bored out for the bearing sleeve 11 so that it is concentric with the normal center of rotation of the shaft 3. I utilize the rib and the circular recess 65 in aligning the shafts 3 and 4 by means of a flanged adapter and pilot member 66 which has an annular projection 67 for engaging the opening 65, and an undercut 69 for engaging the rib 68.

The flange designated 66' has a double series of openings for receiving suitable fastening bolts or screws indicated at 70 and 71. The screws 70 of the inner circle engage ears 73 of the differential housing and the screws 71 of the outer circle, engage the flange 72 of the gearing housing.

To attach the reduction gearing to the differential housing the adapter is first secured to the differential housing with the projection 67 closely fitting the opening 65. The clutch member 26 is then driven over the splined end of the worm shaft, and the housing flange 72 is then bolted to the flange 66' of the adapter member with the rib 68 engaging the undercut 69 to complete the alignment of the rotating parts just mentioned. Thus it will be seen that the member 66 not only serves as a shaft aligner but also as a very compact adapter for the housings.

I arrange for retaining oil in the transmission housing against escape into the differential housing by recessing the adapter for a retainer washer 75 of felt or other suitable material which contacts with the hub of the clutch member 26. A forward extension of the adapter may be provided with the usual spiral grooves 76 as an additional oil retaining means.

In installing my transmission it is not necessary to shorten the radius rods and the only cutting necessary in making the installation is to remove a portion of the torque tube 1'. The support for the tube is shown as cast integrally with the housing portion 14 and may be simply slipped over the cut off end of the tube after which the casing portion 13 is bolted to the differential housing as described.

It will be seen that I have produced a reduction gearing which is very compact and which will give an unusually large reduction while not adding materially to the unsprung weight of the car and which utilizes a number of parts already on the car to facilitate application. I am aware that changes may be made in the arrangement shown without departing from the spirit of my invention and I do not therefore wish to limit myself to mere constructional details.

I claim:—

1. In a transmission gearing, a casing having an oil chamber, a pair of rotatable members mounted therein, a gearing for connecting the rotatable members, including an external gear rigid with one member and an internal gear rigid with the other, a tubular gear member surrounding and spaced apart from one of the members and having sets of teeth in mesh with the respective gears, eccentric rolling bearings for the tubular gear member externally thereof, and mounted in the casing, a tubular bearing spacer rigid on the tubular gear, and oil scooping devices carried on the spacer and arranged to dip oil from the chamber and force it inwardly into the interior of the tubular gear to lubricate the gear teeth when the gearing is operated.

2. In a transmission gearing, a casing having an oil chamber, a pair of rotatable members mounted therein, a gearing for connecting the rotatable members, including a tubular gear member surrounding and spaced apart from one of the members and having internal gear teeth, eccentric bearings for the tubular gear member externally thereof, and mounted in the casing, a tubular bearing spacer rigid on the tubular gear, and oil scooping devices carried on the spacer and arranged to dip oil from the chamber when the gear member is rotated, said devices comprising tangential openings through the spacer member.

3. In a transmission gearing, a casing, a pair of rotatable members mounted in the casing, means for connecting such rotatable members together including a gear train comprising a gear rigid with one of the rotatable members, a composite eccentrically mounted gear having teeth in mesh with said first named gear and a tubular gear having teeth in mesh with the composite gear and surrounding one of the rotatable members, means for connecting the tubular gear to the other of said rotatable members, and means including a rolling bearing the races of which are grooved to retain the rolling elements, one of the races being rigid with the rotatable member carrying the first named gear, the other being rigid with the casing, whereby said gear carrying rotatable member is retained against longitudinal movement relative to the casing.

4. In a gearing, a casing adapted to retain oil, a pair of rotatable members extending thereinto, a pinion rigid with one of the members, an eccentrically mounted hollow gear member having teeth in mesh with the pinion, a geared connection between said hollow member and the other rotatable member, and means including a lateral opening through the hollow gear member and a device associated therewith adapted to dip oil from the casing when the hollow gear is rotated and force it inwardly toward the gear and pinion teeth.

5. In a transmission gearing, a casing having an oil chamber, a pair of rotatable members mounted therein, a gearing for connecting the rotatable members including a hollow gear having a plurality of sets of teeth, one set comprising internal teeth and each set having a respective geared connection with the said rotatable members, the hollow gear being in surrounding eccentric relation to one of the rotatable members, bearings carried rigidly by the casing for supporting the hollow gear member, and means carried by the hollow member and arranged to dip oil from said chamber and force the same into the interior thereof to lubricate the gears.

6. In a transmission gearing a casing formed to provide an oil supply chamber, a pair of rotatable members located therein in mutual alignment, an eccentrically mounted hollow gear surrounding one of the members and having a plurality of sets of gear teeth, each set having a geared connection with a respective rotatable member, longitudinally separated rolling bearings for the hollow gear member, an opening in the hollow gear member located between said bearings, and an oil scooping device rigid with the hollow gear and communicating with the opening and arranged to dip oil from the supply and force it inwardly toward certain of the gears when the hollow gear member is rotated.

7. In a gearing, a stationary casing, a pair of shafts extending thereinto from opposite directions, means for connecting the shafts for a given speed, means for connecting the shafts for another speed comprising gears for each of the shafts coaxial with the respective shafts, and a compound hollow gear having separate sets of teeth for connecting the aforesaid other gears, a bearing externally of the compound gear for supporting it on an axis eccentric to one of the shafts and in fixed relation to the casing, said bearing comprising separated bearing supporting members joined to the casing and separated from the casing wall for a portion of their extent and anti-friction rolling elements interposed between each of said members and the hollow gear.

In testimony whereof, I hereunto affix my signature.

CHARLES E. F. AHLM.